United States Patent
Gebara et al.

[11] Patent Number: 6,035,407
[45] Date of Patent: *Mar. 7, 2000

[54] ACCOMODATING COMPONENTS

[75] Inventors: Ghassan R. Gebara; Kenneth A. Jansen, both of Spring, Tex.

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/680,487

[22] Filed: Jul. 15, 1996

Related U.S. Application Data

[63] Continuation-in-part of application No. 08/515,030, Aug. 14, 1995, abandoned, application No. 08/514,565, Aug. 14, 1995, abandoned, application No. 08/514,758, Aug. 14, 1995, abandoned, and application No. 08/515,108, Aug. 14, 1995, abandoned.

[51] Int. Cl.$^7$ .................................. G06F 1/00
[52] U.S. Cl. .......................................... 713/300
[58] Field of Search ................................ 395/750

[56] References Cited

U.S. PATENT DOCUMENTS

| | | |
|---|---|---|
| 5,254,883 | 10/1993 | Horowitz et al. |
| 5,345,109 | 9/1994 | Mehta ............................ 307/271 |
| 5,363,335 | 11/1994 | Jungroth et al. ............... 365/226 |
| 5,404,310 | 4/1995 | Misuhashi ...................... 364/490 |
| 5,483,188 | 1/1996 | Frodsham . |
| 5,493,683 | 2/1996 | Cloud et al. .................... 395/750 |
| 5,530,620 | 6/1996 | Sangveraphunsiri ........... 361/686 |
| 5,537,581 | 7/1996 | Conary et al. .................. 395/550 |
| 5,548,226 | 8/1996 | Takekuma et al. . |
| 5,550,496 | 8/1996 | Desroches . |
| 5,551,012 | 8/1996 | Chuang et al. ................. 395/500 |

OTHER PUBLICATIONS

NEC, VR4000–Series™ Architecture Including VR4400™User's Manual, *PLL Passive Components*, pp. E–1–E–3, © 1993, MIPS Technologies, Inc.

Universal Serial Bus Specification, Revision 1.0, Compaq Computer Corporation et al., pp. 1–268 (Jan. 1996).

Access.bus Specification, Version 3.0, *Access.bus Industry Group*, pp. 1–1 to 9–7 (Sep. 1995).

PCI Local Bus Specification, Production Version, Revision 2.1, pp. 1–281 (Jun. 1995).

Amiga Hardware Reference Manual, 3rd Ed., *Commodore–Amiga, Inc.*, pp. 383–439 (1991).

Haynie, D., "Addendum to the Zorro III Bus Specification, Zorro III Bus Timing," Revision 1.0, *Commodore–Amiga, Inc.* pp. 1–12 (Apr. 1993).

Kunzman, A.J. et al., "1394 High Performance Serial Bus: The Digital Interface for ATC," *IEEE Transactions on consumer Electroncs*, vol. 14, pp. 893–900 (Aug. 1995).

Heinrich, J., "Pll Passive Components," *MIPS R4000 Users Manual*, pp E–1 to E–3, (1993).

Pentium®Pro Family Developer's Manual, Electrical Specification, *Intel*, vol. 1: Specification, pp. 11–7 to 11–8, (Jan. 1996).

*Primary Examiner*—Ayaz R. Sheikh
*Assistant Examiner*—Jigor Pancholi
*Attorney, Agent, or Firm*—Conley, Rose & Tayon, P.C.; Michael F. Heim; Jonathan M. Harris

[57] ABSTRACT

A computer includes a packaged integrated circuit having an information storage area containing information determined only after the integrated circuit is packaged and tested, and a control circuit that uses the information to configure the computer. A computer also may include a bus line connecting two GTL electronic components at a single termination point and a pull-up resistor connecting the termination point to a termination voltage supply.

54 Claims, 10 Drawing Sheets

FIG.2
| VID[3:0] | VOLTAGE SETTING |
|---|---|
| 0000 | 3.5V |
| 0001 | 3.4 |
| 0010 | 3.3 |
| 0011 | 3.2 |
| 0100 | 3.1 |
| 0101 | 3.0 |
| 0110 | 2.9 |
| 0111 | 2.8 |
| 1000 | 2.7 |
| 1001 | 2.6 |
| 1010 | 2.5 |
| 1011 | 2.4 |
| 1100 | 2.3 |
| 1101 | 2.2 |
| 1110 | 2.1 |
| 1111 | NO CPU |
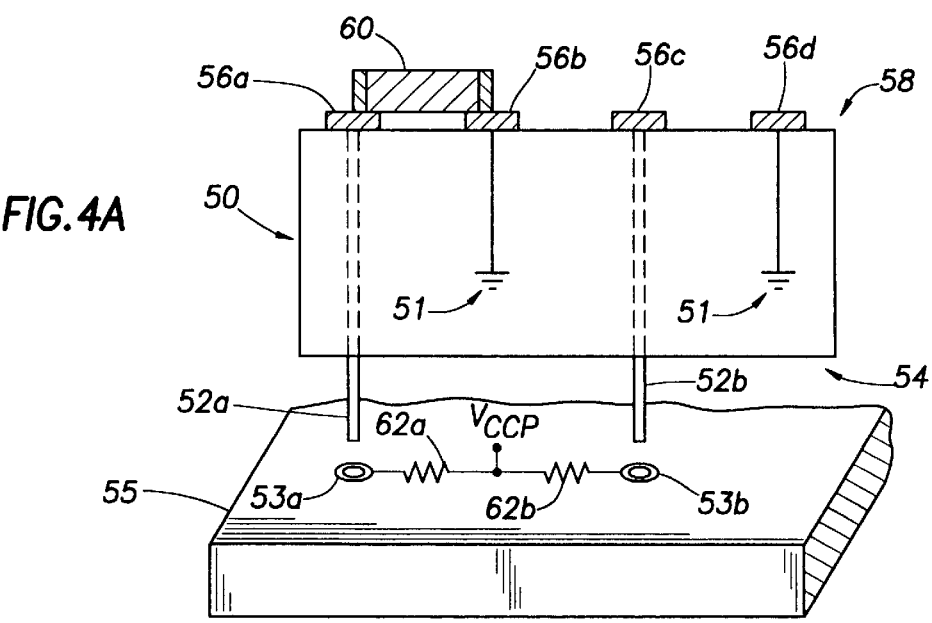
FIG.4A
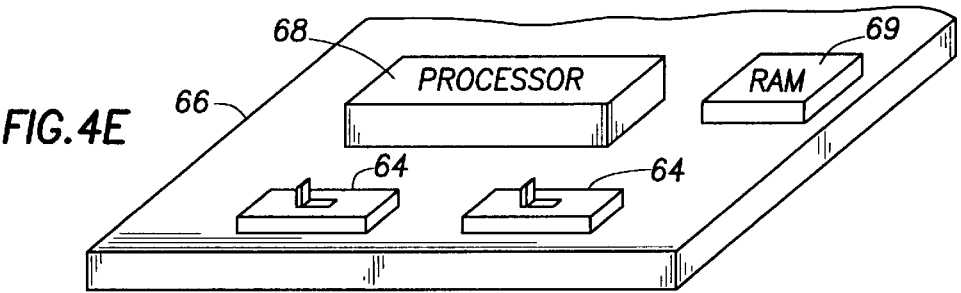
FIG.4E

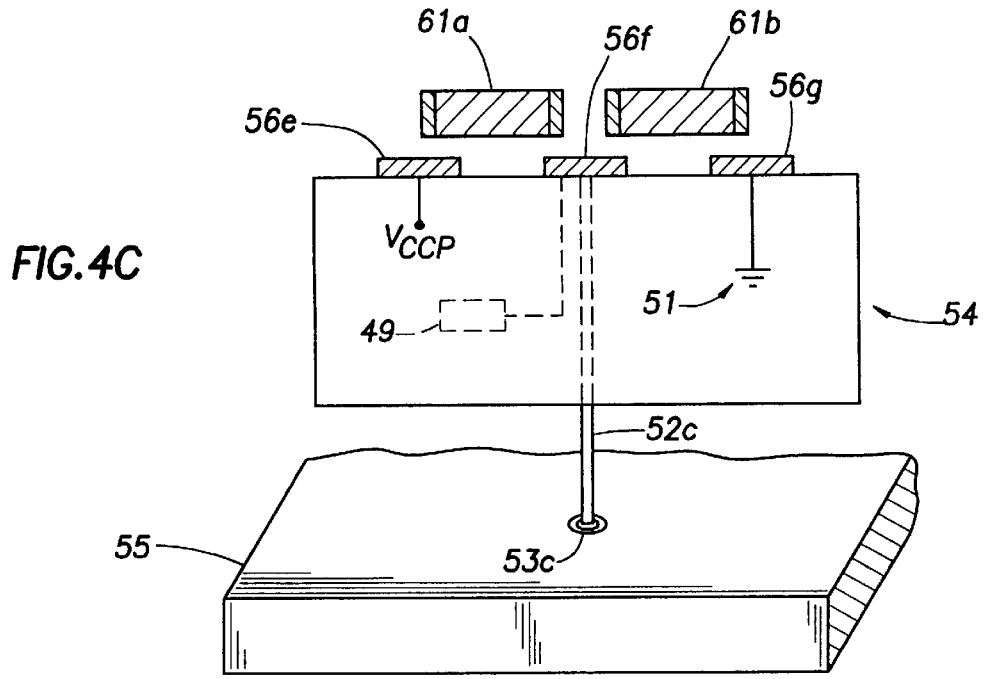
FIG.4C
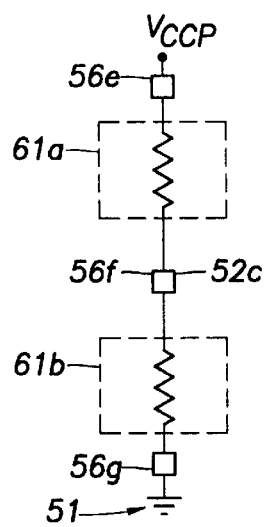
FIG.4D
FIG.5
| CORE FREQUENCY | FIDO[2:0] |
|---|---|
| 120MHZ | 000 |
| 133MHZ | 001 |
| 150MHZ | 010 |
| 166MHZ | 011 |
| 180MHZ | 100 |
| 200MHZ | 101 |
| RESERVED | 110 |
| RESERVED | 111 |

| BUS/CORE | MIDO[2:0] |
|---|---|
| 2/4 | 000 |
| 2/5 | 001 |
| 2/6 | 010 |
| 2/7 | 011 |
| 2/8 | 100 |
| 2/9 | 101 |
| 2/10 | 110 |
| 2/11 | 111 |

| PROCESSOR TYPE | UP# | PT |
|---|---|---|
| P6.0 | 1 | 0 |
| P6S | 1 | 1 |
| OVERDRIVE | 0 | 0 |
| TBD | 0 | 1 |

| CACHE SIZE | PSCS |
|---|---|
| 128K | 00 |
| 256K | 01 |
| 512K | 10 |
| TBD | 11 |

| BIT | NAME | DESCRIPTION |
|---|---|---|
| 7 | R | RESERVED |
| 3 | ORVID[3] | THIS BIT INDICATES THE SIGN OF REGULATION WITH RESPECT TO THE REFERENCE VOLTAGE SETTING (VID) 0=INCREASE THE VOLTAGE 1=DECREASE THE VOLTAGE |
| 2 | ORVID[2] | BITS [2:0] SET THE MAGNITUDE OF REGULATION |
| 1 | ORVID[1] | BITS [2:0] SET THE MAGNITUDE OF REGULATION |
| 0 | ORVID[0] | BITS [2:0] SET THE MAGNITUDE OF REGULATION |

FIG. 13

| ORVID[3:0] | VOLTAGE SETTING |
|---|---|
| 1111 | NO CHANGE |
| 1110 | −100mV |
| 1101 | −200 |
| 1100 | −300 |
| 1011 | −400 |
| 1010 | −500 |
| 1001 | −600 |
| 1000 | −700 |
| 0111 | NO CHANGE |
| 0110 | +100 |
| 0101 | +200 |
| 0100 | +300 |
| 0011 | +400 |
| 0010 | +500 |
| 0001 | +600 |
| 0000 | RESERVED |

FIG. 14

| BIT 7 | BIT 6 | BIT 5 | BIT 4 | BIT 3 | BIT 2 | BIT 1 | BIT 0 |
|---|---|---|---|---|---|---|---|
| R | | | | ORVID[3] | ORVID[2] | ORVID[1] | ORVID[0] |

FIG. 16

| ORVTTID[2:0] | VOLTAGE SETTING |
|---|---|
| 110 | −100mV |
| 101 | −200 |
| 100 | −300 |
| 011 | NO CHANGE |
| 010 | +100 |
| 001 | +200 |
| 000 | +300 |
| 111 | NO CHANGE |

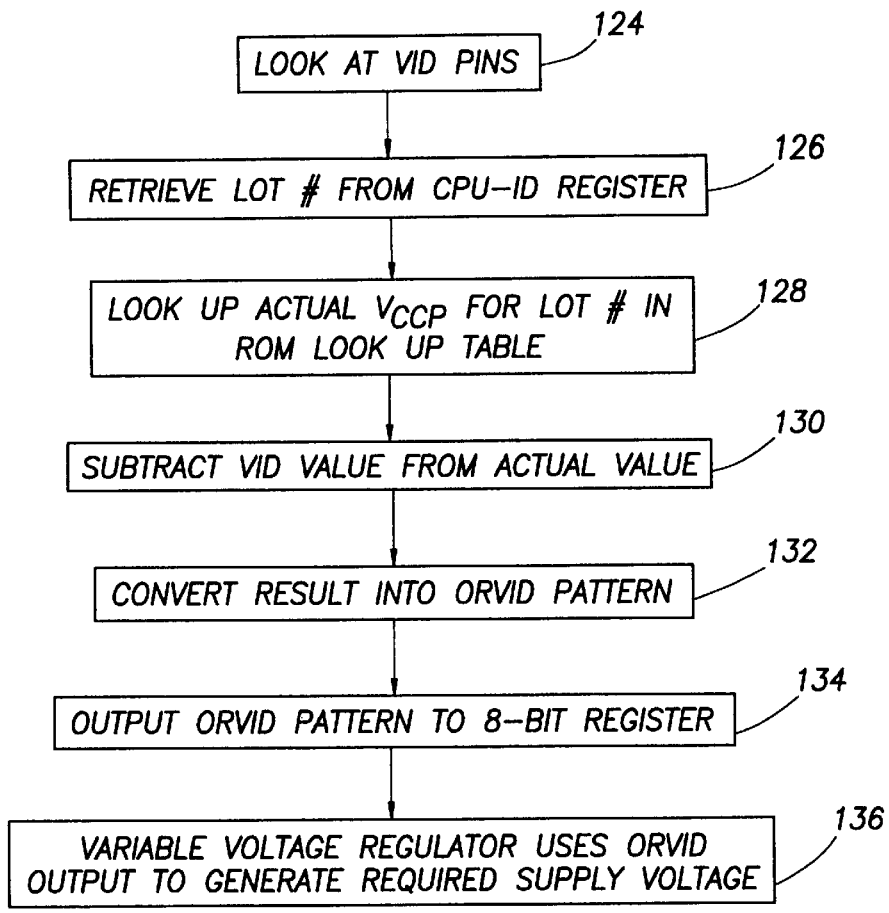

ACCOMODATING COMPONENTS

This application is a continuation-in-part of U.S. applications Ser. Nos. 08/515,030, 08/514,565, 08/514,758, and 08/515,108, all of which were filed on Aug. 14, 1995 all now abandoned.

BACKGROUND

The invention relates to accommodating different components.

Processors for Desk top/Server platforms are available from a variety of manufacturers such as Intel, Analog Micro Devices ("AMID"), Cyril, and NexGen. While all processors are designed to operate in essentially the same environment, each manufacturer designs its processors to be somewhat different than those of the other manufacturers. In addition, each manufacturer periodically upgrades its processor families, releasing products that differ from those previously offered by that manufacturer.

The computer system manufacturer that wishes to use several types of computer processors or to provide its customers with available processor upgrades must accommodate the differences between the processors. Typically, this requires the computer manufacturer to develop and maintain a distinct hardware design (e.g., printed circuit card) for each processor it wishes to accommodate. When a processor upgrade becomes available, instead of simply substituting the upgraded processor for the obsolete processor, the computer manufacturer must provide an upgraded processor card. As a result, both the computer manufacturer and its customers must incur significant expense to keep up with processor improvements.

Referring to FIG. 1A, the typical computer includes a processor 20 which has internal primary cache memory (not shown) and which is connected to secondary cache memory 22 via a system bus 24. Referring to FIG. 1B, some newer processors, such as Intel's Pentium Pro processor, include secondary cache 22 in the same package 16, and the CPU communicates with secondary cache 22 using a private internal bus 18. The NexGen Nx586 and H86 processors are connected to secondary cache through a dedicated bus (not shown) that services only the processor and the secondary cache. Secondary cache memories typically have sizes of 128K bytes, 256K bytes, or 512K bytes, but may have other values in certain applications.

The processor 20 is driven by a system clock 26, (bus clock) which typically oscillates at a frequency between 50 MHz and 66 MHz. However, today's processors usually operate at core frequencies much greater than the standard bus clock speeds, with core speeds typically varying from 100 MHz to more than 200 MHz. As a result, the processor 20 must multiply the bus clock frequency to attain a higher core speed. For example, a 150 MHz processor running from a 60 MHz bus clock (i.e., a bus/core ratio of 2/5) must multiply the bus clock frequency by a factor of 5/2. The computer system not only provides the bus clock 26 to the processor 20, but typically it also supplies the value of the frequency multiplier to the processor through a multi-bit input signal 28 to ensure that the processor operates at the proper speed.

The processor 20 interacts with memory 21 through a memory data path 23 and a memory interface buffer 25. A memory data controller 27 manages the flow of data through the memory device 21 and the memory interface buffer 25. The processor 20 also may access the system's PCI bus 29 through a PCI bridge 31. The PCI bus 29 is connected to the system's ISA/EISA bus 33 through a PCI/EISA bridge 35.

Each processor is designed to operate at a specific primary core voltage $V_{CCP}$. The core voltage may vary not only between processor families but also between processors of the same family, including processors that otherwise appear to be the same. For example, Intel's P6.0 150 MHz processor is targeted to operate at a core voltage of 3.1 volts. However, down-binned processors that do not meet this requirement may still be rated at 150 MHz for a higher core voltage, e.g., 3.3 volts. Or a processor targeted to operate with a core speed of 180 MHz at 3.3 volts may fail to meet this requirement, but may satisfy a down-binned requirement of 150 MHz at a core voltage of only 3.1 volts. As a result, the computer manufacturer often must maintain several hardware designs even for a single processor type.

Referring to FIG. 2, Intel has included on each Pentium Pro processor package four voltage identification (VID) pins. The VID pins provide four bits 30 of binary data that indicate the designed core voltage setting $V_{CCP}$ 32 for that processor. The VID bits 30, which are hardwired to a particular value when the processor is packaged, identify a core voltage setting that is correct only if the processor actually operates at the designed voltage $V_{CCP}$ (i.e., the processor is not down-binned).

Referring now to FIG. 3, many processors implement a bus interface technology known as gunning transceiver logic (GAL). In a GAL system, a processor 34 and other components 36, 38 having open drain I/O ports are linked in daisy-chain fashion by a bus 40, each end of which must be pulled to a termination voltage $V_{TT}$ by pull-up resistors 42, 44. If either of the pull-up resistors 42, 44 is missing, the GAL system will not operate properly. Similar pull-up resistors are required for every signal line connecting the processor 34 and the other system components 36, 38. Thus, for a 160-signal bus, 320 pull-up resistors are needed.

*JEDEC Standard JESD8-3: Gunning Transceiver Logic (GAL) Low-Level, High-Speed Interface Standard for digital Interface Circuits.

Under the GAL standard, the termination voltage $V_{TT}$ has a value of 1.2 volts. HIGH and LOW level logic signals are determined by a reference voltage $V_{REF}$, which by definition has a value equal to $\frac{2}{3} V_{TT}$, or 0.8 volts. However, because this value of $V_{REF}$ is so close to typical noise levels, a digital standard known as GAL+ was created to provide greater noise margin. Under the GAL+ standard, the termination voltage $V_{TT}$ is 1.5 volts and the reference voltage $V_{REF}$, which equals $\frac{2}{3} V_{TT, is}$ 1.0 volts.

SUMMARY

In one aspect, the invention features a computer having a packaged integrated circuit with an information storage area containing information about the circuit determined only after the circuit is packaged, and a control circuit that uses the information to configure the computer.

Embodiments of the invention may include one or more of the following features. The integrated circuit may include at least one conductive pin protruding from the package to pass the information to the control circuit. The integrated circuit also may include a value selection element that determines the information provided via the conductive pin. The value selection element may include an electrically conductive element connected at one end to the conductive pin and at another end to a voltage supply. The integrated circuit may be a processor. The information stored in the information storage area may indicate a supply voltage value required by the integrated circuit, or it may indicate the difference between a supply voltage value required by the integrated circuit and a nominal design value.

In another aspect, the invention features a computer having a processor with an input element that allows an operational parameter of the processor to be selected from a predetermined group of parameters after the processor is packaged, and a selection device connected to the input element that controls selection of the operational parameter from the group.

Embodiments of the invention may include one or more of the following. The parameter may be core operating frequency or bus/core ratio. The input element may include a conductive lead extending from a surface of the processor package into the processor. The selection device may include an electrically conductive element connected at one end to the conductive lead and at another end to a voltage supply.

In another aspect, the invention features a method of configuring a computer system by retrieving from a packaged integrated circuit information about the circuit that is determined only after the circuit is packaged, and by using the information to configure the computer system.

In another aspect, the invention features a computer system comprising a packaged integrated circuit that provides information about a characteristic, other than a voltage requirement, of the integrated circuit, and control circuitry that configures the computer system in response to the information provided by the integrated circuit.

Embodiments of the invention may include one or more of the following features. The integrated circuit may include at least one conductive pin that passes the information. The integrated circuit may be a processor, and the characteristic be bus/core ratio, core operating frequency, processor type, or secondary cache memory size.

In another aspect, the invention features a method of configuring a computer system to accommodate a packaged integrated circuit by accessing information about a characteristic, other than a required voltage value, of the integrated circuit, and by using the information to configure the computer system.

In another aspect, the invention features a processor having at least one conductive pin that passes information about a characteristic of the processor, and an external value selection element that determines the information provided by the conductive pin after the processor is packaged.

Embodiments of the invention may include one or more of the following features. The external value selection element may include an electrically conductive device connected electrically at one end to the conductive pin and at another end to a voltage supply. The external value selection element may include a resistor. The processor also may include two conductive pads electrically connected to each other by the external value selection element on an external surface of the processor, one of the pads connecting to the conductive pin and the other pad connecting to a voltage source.

In another aspect, the invention features a computer having a bus line connecting two GAL electronic components at a single termination point, and a pull-up resistor connecting the termination point to a termination voltage supply. In some embodiments of the invention, the computer also may include a third GAL electronic component connected to one of the two electronic components or to the termination point.

Advantages of the invention may include one or more of the following. Certain information about the processor in a computer system is readily available to the computer system. This information may include the processor's core voltage, its required digital logic supply voltage, and certain operational parameters, such as processor type, speed grade, bus/core ratio, and cache size. The information may be stored on the processor after the processor is packaged and tested. The computer system may retrieve the information automatically and use the information to configure itself for proper operation with the processor. As a result, the need for multiple hardware designs is reduced, and the computer manufacturer may use a single bill-of-materials to build mother boards compatible with several different processors. Also, the computer user may make on-the-fly processor upgrades without having to replace existing computer hardware.

In addition, a GAL-based bus in the computer system may be terminated by a resistor network having only a single pull-up resistor. As a result, lower current and power demands are placed on the termination voltage supply. The resistor network may be located anywhere along the bus to allow greater freedom in circuit board design.

Other advantages and features will become apparent from the following description and from the claims.

DESCRIPTION

FIG. 2 is a diagram of a voltage identification output scheme.

FIGS. 4A, 4C, and 4E are perspective views of fragments of a processor package and a printed circuit card.

Figure 1A:
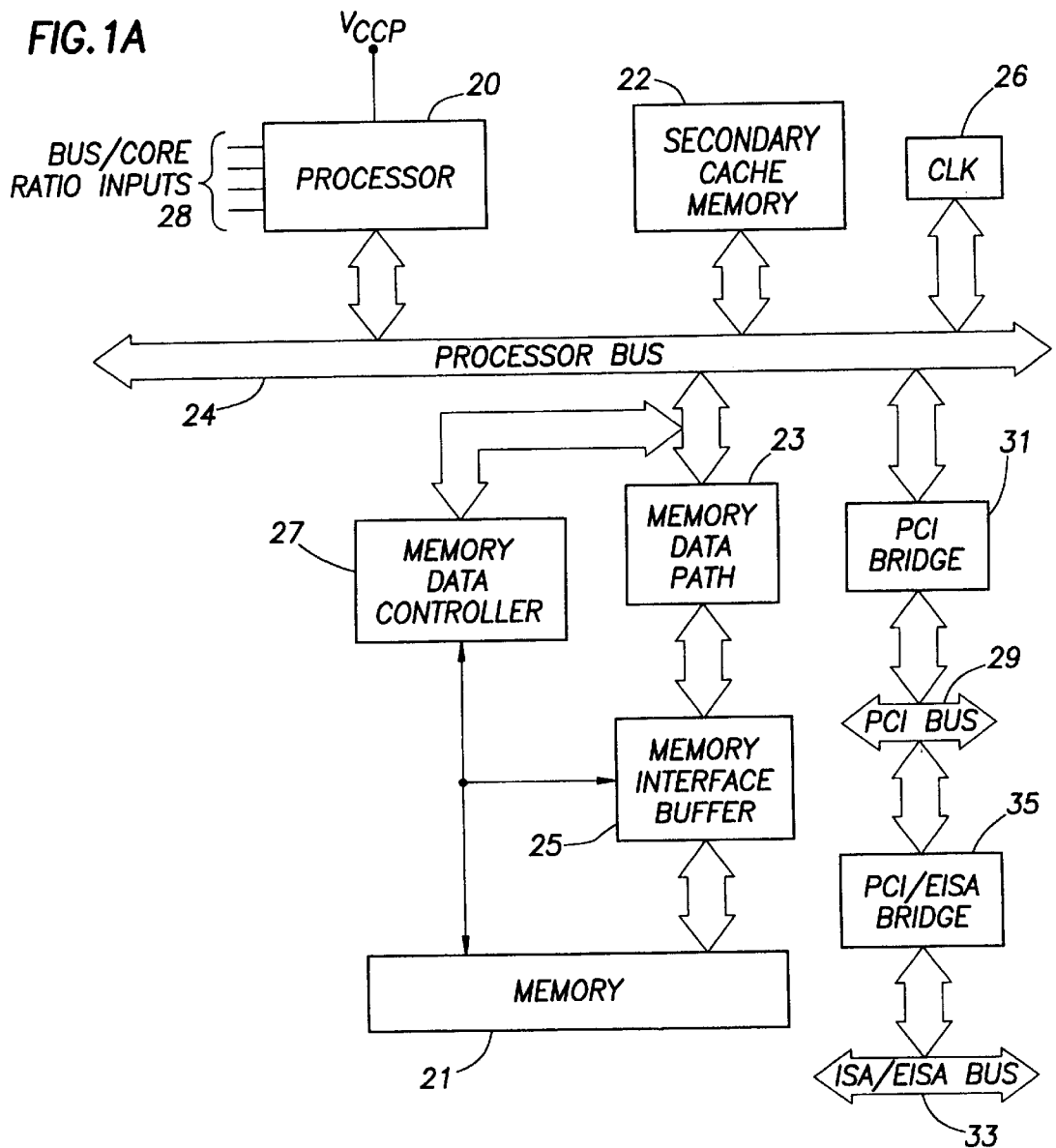
FIGS. 1A and 1B are block diagrams of conventional computer system components.
Figure 3:
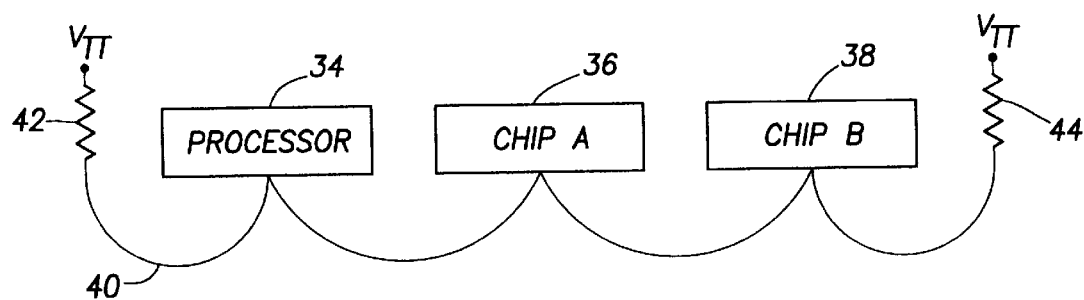
FIG. 3 is a block diagram of computer components connected via a GAL bus.
Figure 1B:
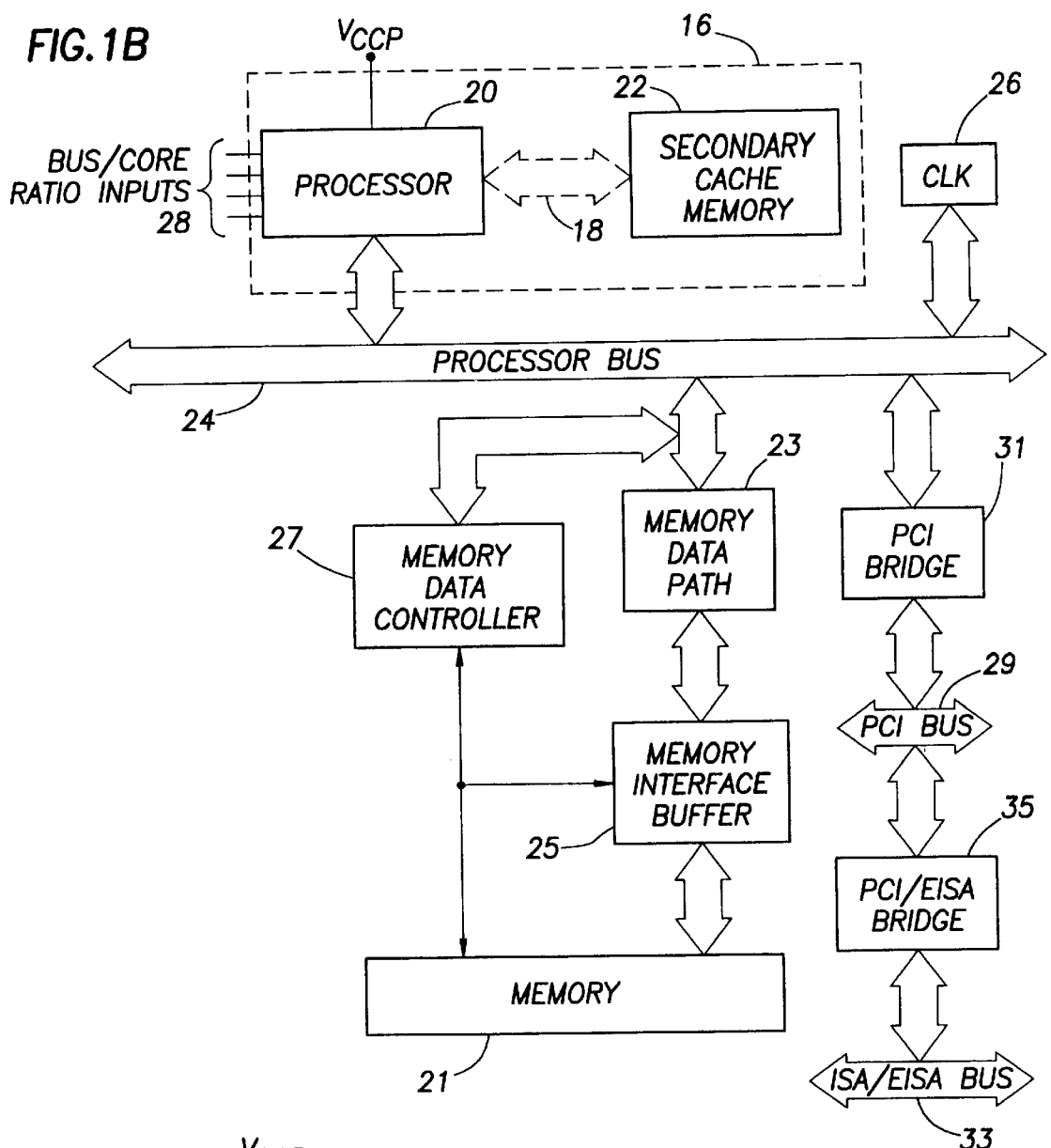
Figure 4B:
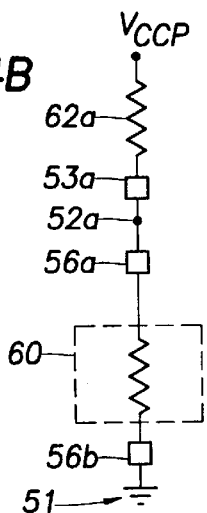
Figure 4F:
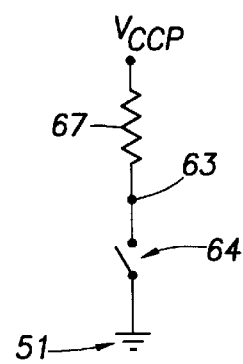

FIGS. 4B, 4D, and 4F are schematic diagrams of circuits that provide processor information.

FIG. 5 is a diagram of a frequency identification output scheme.

Figures 6, 7, 8, 9:
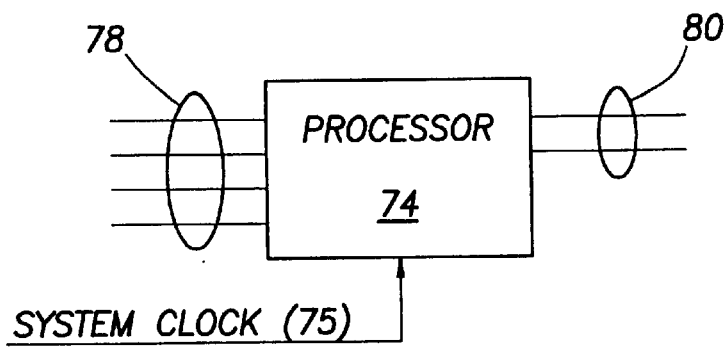

FIG. 6 is a block diagram of a processor.

FIG. 7 is a diagram of a bus/core ratio identifier scheme.

FIG. 8 is a diagram of a processor type identification scheme.

FIG. 9 is a diagram of a cache size identification scheme.

Figure 10A:
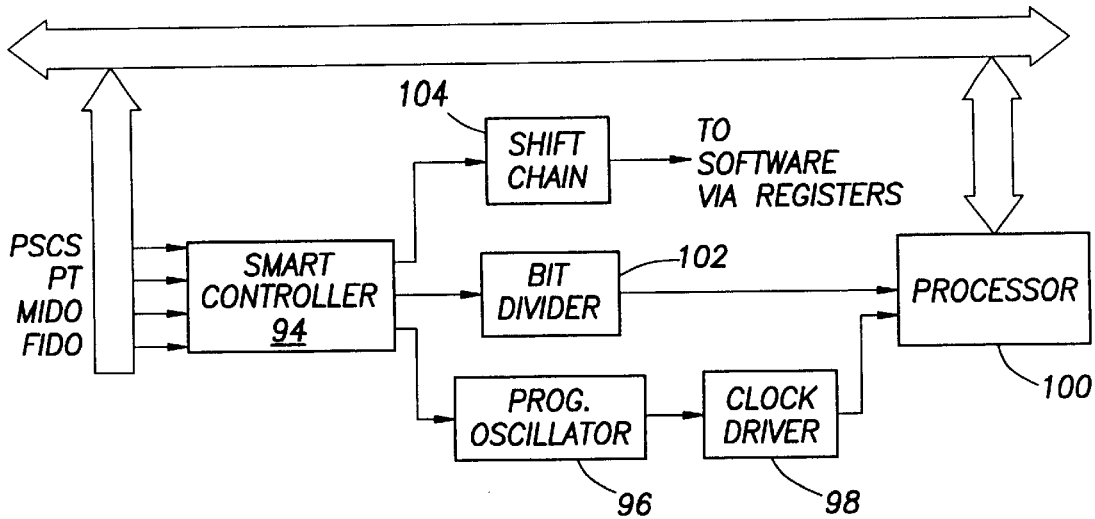

FIG. 10A is a block diagram of computer system components required to accommodate different processors.

Figures 10B, 12:
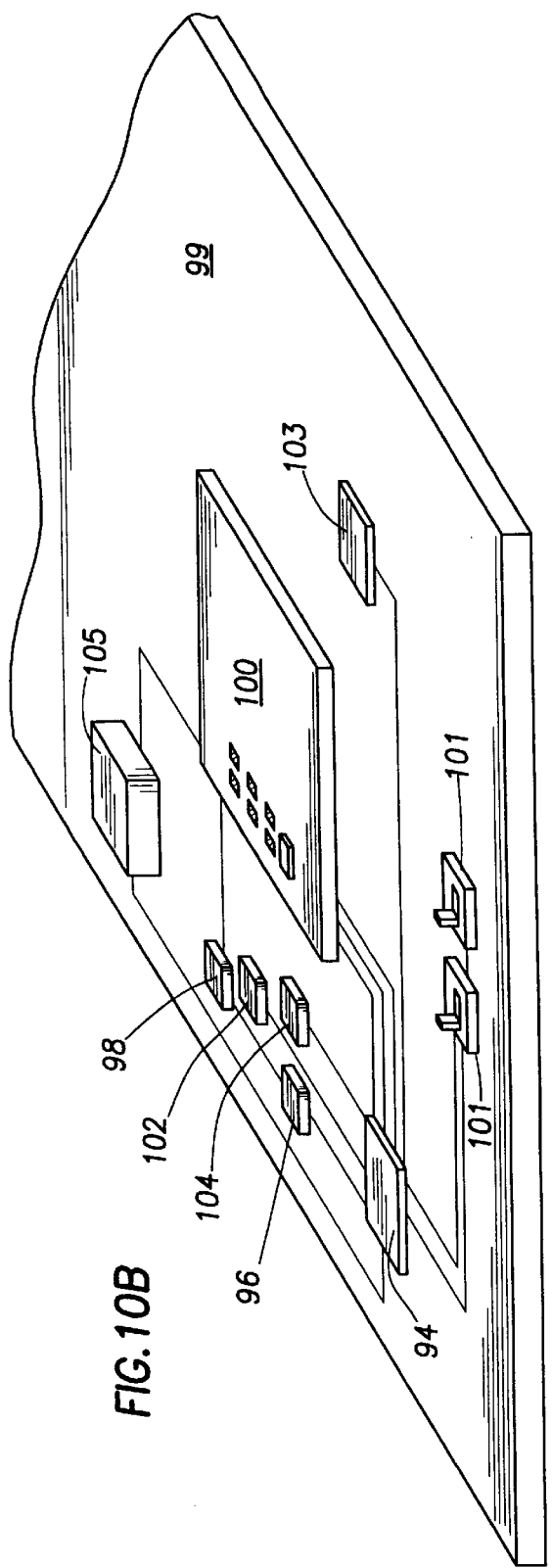

FIG. 10B is a perspective view of a processor circuit board.

Figure 11:
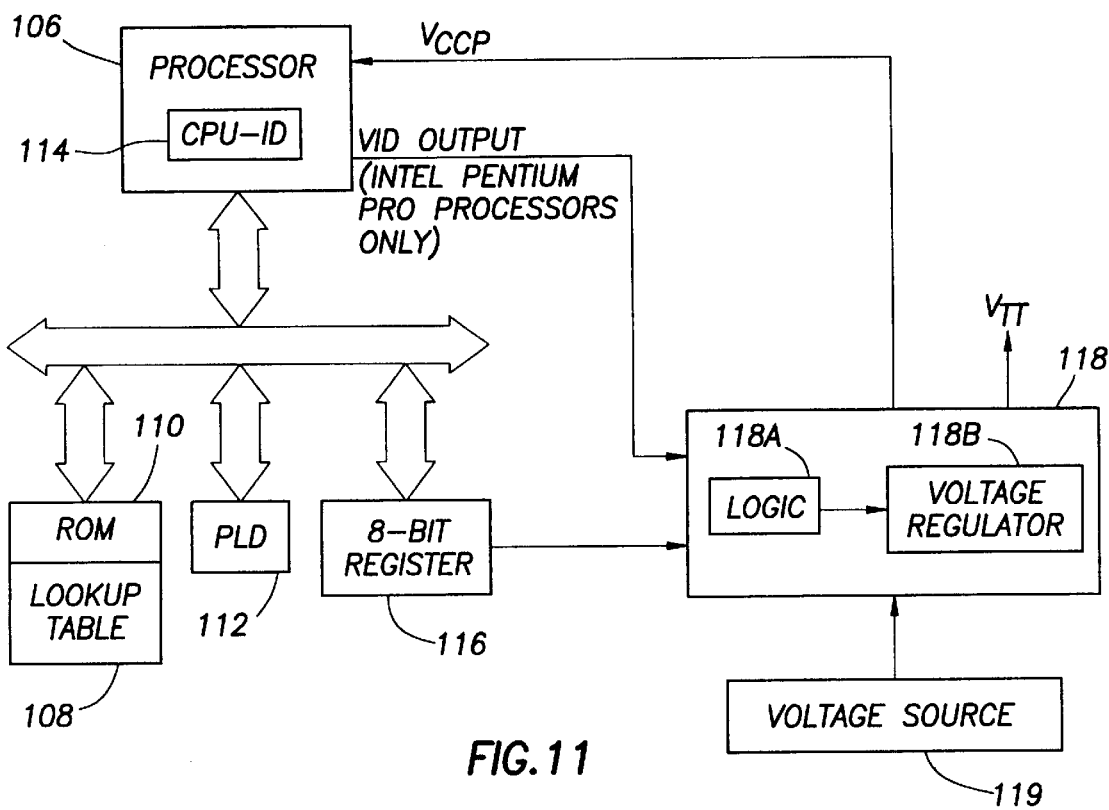

FIG. 11 is a block diagram of computer system components required to accommodate different processors.

FIG. 12 is a bit definition diagram for a core voltage override scheme.

FIG. 13 is a diagram of the core voltage override scheme of FIG. 12.

FIG. 14 illustrates the storage of core voltage override information.

FIG. 15 is a flow diagram for generating voltage override information.

FIG. 16 is a diagram of a termination voltage override scheme.

FIG. 17 is a bit definition diagram for the termination voltage override scheme of FIG. 16.

FIG. 18 illustrates the storage of termination voltage override information.

Figure 19:
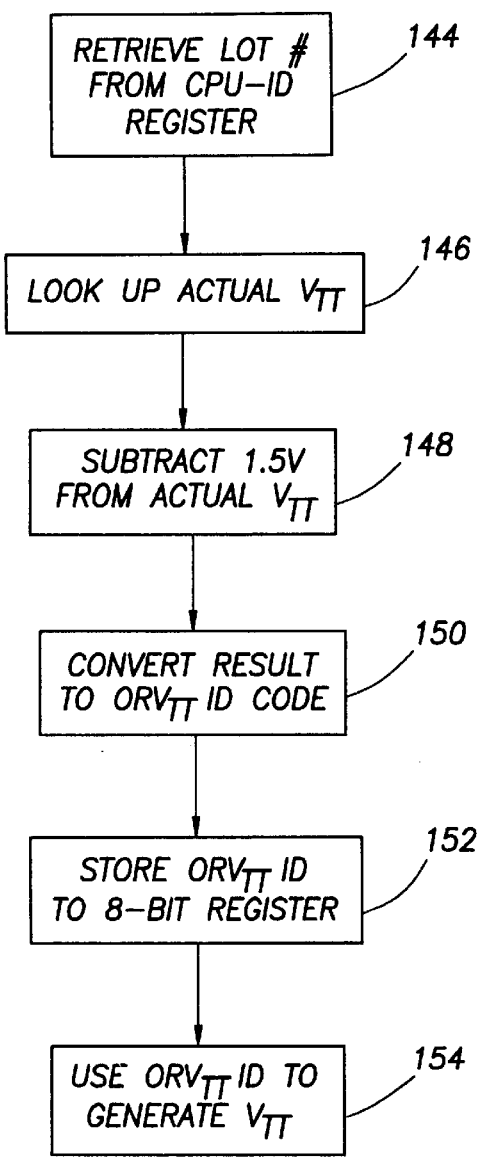

FIG. 19 is a flow diagram for generating termination voltage override information.

Figure 20:
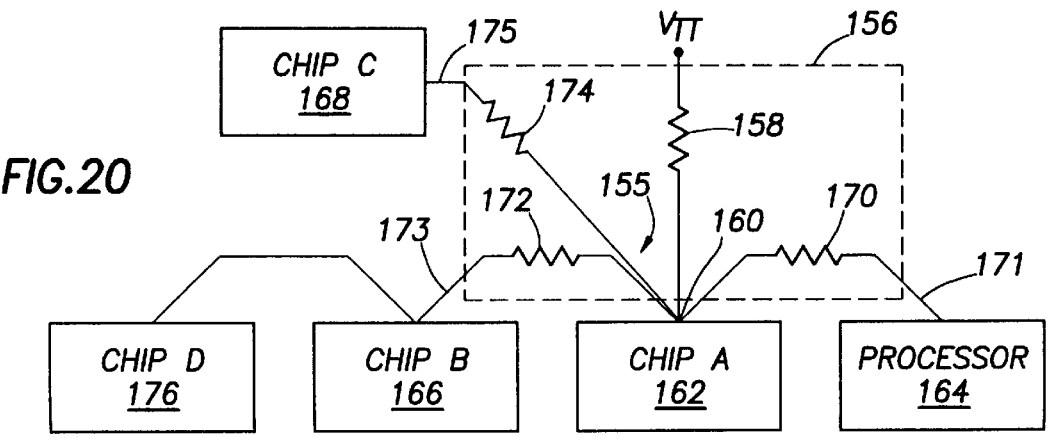

FIG. 20 is a block diagram of components connected via a GTL bus.

By directly and automatically providing from the processor itself information that identifies the operational characteristics and requirements of a processor, processor manufacturers and computer system manufacturers may simplify the manner in which different processors, e.g., an upgrade processor, may be accommodated in a computer system. Processor information may include the processor type, the processor core frequency, the bus/core ratio (and thus the frequency multiplier), the secondary cache memory size, the required core voltage setting, and the required termination voltage setting (for systems using GTL/GTL$^+$). When this type of processor information is available, the computer system may be designed to retrieve the information and to automatically configure the system hardware and software to match the requirements of a particular processor. As a result, processor changes become simpler, making possible "on-the-fly" changes even while the computer is powered-up and operating. System board changes are also minimized because a single board design may accommodate a variety of processors.

Referring to FIG. 4A, the processor information is provided by pins 52a, 52b that extend from the ceramic processor package 50. Each pin 52a, 52b provides one binary bit of information and is electrically connected to a conductive pad 56a, 56c mounted on the upper surface 58 of the processor package 50. Each conductive pad 56a, 56c is paired with another conductive pad 56b, 56d that is connected to a ground signal 51 inside the processor package 50. The processor manufacturer sets the binary values of the pins 52a, 52b by electrically connecting the corresponding pair of conductive pads 56a, 56b or 56c, 56d, or by leaving the pads unconnected. Pads 56a and 56b or pads 56c and 56d may be connected by soldering an electronic component 60, e.g., a low-value resistor or a conductive wire, between the pads. When the processor package 50 is mounted to a printed circuit board 55, the pins 52a, 52b are tied to the primary supply voltage $V_{CCP}$ through pull-up resistors 62a, 62b. The pins 52a, 52b connect to the pullup resistors 62a, 62b through contact pads 53a, 53b on the printed circuit board 55.

Referring also to FIG. 4B, if no component is placed between pads 56a and 56b, pull-up resistor 62a pulls the binary bit at pin 52a to a high value. Thus, in FIG. 4A, the output at pin 52b is high because the corresponding pads 56c and 56d are not connected. Because pads 56a and 56b are connected, the output at pin 52a is pulled to a low value by the ground signal in the processor package 50. Therefore, the output corresponding to pins 52a and 52b is a binary value of "10".

Referring to FIGS. 4C and 4D, the pull-up resistors 62a, 62b (FIGS. 4A and 4B) may be eliminated from the circuit board 55 if each pin 52c is associated with three conductive pads 56e, 56f, 56g, one of which (pad 56f) is electrically connected to the pin 52c (or to an internal bond pad 49, as discussed below) and the other two of which are connected to $V_{CCP}$ and ground 51 (pads 56e and 56g, respectively). When a low-value (e.g., zero ohm) resistor 61a is soldered between pads 56e and 56f, the output signal on the pin 52c (and therefore at pad 53c on the circuit board 55) is pulled to $V_{CCP}$. When a resistor 61b is soldered between pads 56f and 56g, the output signal on the pin 52c is pulled to ground 51. Resistors 61a and 61b cannot both be present at the same time.

The processor information also may be stored elsewhere in the computer system, such as in another device on the circuit board instead of on the processor itself. Referring to FIG. 4E, information about different processors may be stored in a memory device 69 (e.g., RAM). When a processor 68 is installed to the board, information identifying the processor may be retrieved from the processor's CPU-ID register (not shown) and used to access the appropriate information in RAM 69, e.g., in a manner similar to that described below with reference to FIG. 11.

Referring to FIGS. 4E and 4F, the processor information also may be provided by switches 64 located on the processor circuit board 66. Each switch 64 is an on/off switch that connects to a data line 63 on one side and circuit ground 65 on the other side. When the switch is closed, the data line 63, and thus the corresponding bit of processor information, is pulled to a low value. When the switch is open, a pull-up resistor 67 connected to the primary supply voltage $V_{CCP}$ pulls the data line 63 to a high value. When switches 64 are used, the computer manufacturer must obtain the processor information from the processor manufacturer and set the switches 64 to provide the appropriate binary outputs. While the use of switches 64 does not allow true "on-the-fly" processor changes, the switches 64 do eliminate the need for multiple circuit boards to accommodate different processors.

Referring to FIG. 5, the actual core operating frequency ("speed grade") 70 of the processor may be provided by one or more Frequency Identification Output (FIDO) binary bits 72. When four or fewer different speed grades are available for a processor family, one or two FIDO bits 72 will suffice. For Intel's Pentium and Pentium Pro processor families, several speed grades are offered: 133 MHz, 150 MHz, 166 MHz, 180 MHz and 200 MHz. These speed grades may be represented by FIDO settings of "001", "010", "011", "100", and "101", respectively, with the digital values "110" and "111" being reserved for a future Pentium Pro speed grades. If one or two speed grades are available, only one FIDO bit is needed, and if five or more speed grades are available, more than two FIDO bits are necessary. Each FIDO bit is provided by one of the pins 52 (FIGS. 4A and 4C) or switches 64 (FIG. 4E) discussed above. The pins 52 and switches 64 also may be used to output the MIDO, PT, and PSCS identifier bits described below.

Referring now to FIGS. 6 and 7, a processor 74 requires the computer system to provide it not only with a system clock 75 of a specific frequency, but also typically with the bus/core ratio 76 (i.e., the required frequency multiplier). For the Intel Pentium Pro family of processors, the processor 74 requires a 4-bit input signal 78 indicating the bus/core ratio 76, which it then uses to multiply the system clock frequency 75 to produce the desired processor clock speed. Because the bus/core ratio is determined by the processor manufacturer, bus/core ratio information could be provided directly from the processor to the computer system. Thus, to simplify processor upgrades, Multiplier Identification Output (MIDO) pins 80 may be placed on the processor to generate a digital code 82 identifying the bus/core ratio 76 of the processor. Because the number of possible bus/core ratios 76 varies widely among the many processor families, the number of MIDO pins 80 will vary. In general, however, eight bus/core ratios 76 are available for a processor family, so three MIDO bits 82 will suffice. For example, bus/core ratios 76 of 1/4, 1/3, and 1/2 may have corresponding MIDO outputs of "100", "010", and "000", respectively.

Referring now to FIG. 8, the processor may also provide information about its type 84 within a given family. For example, Intel's Pentium Pro family currently consists of P6.0, P6S, and overdrive processors. To ensure the possibility of an on-the-fly upgrade, a Pentium Pro-based computer system must be able to determine which of the three types of Pentium Pro processor is installed. A Processor Type (PT) output 86 may be provided by the processor package to indicate the processor's type 84. If a processor family consists of only one or two types 84, a single PT bit 84 will suffice. Since most processor families include three or four processor types 84, two PT bits 86 usually will be required. Intel's Pentium Pro processors present a special case, because they already provide a UP# bit 88 that indicates whether the processor is an "upgrade" or "overdrive" processor. While the UP# bit 88 allows the computer system to distinguish between overdrive and non-overdrive processors, it does not allow the system to determine the processor type. Therefore, for the Intel Pentium Pro processor, a single PT bit 86 is needed in addition to the UP# bit 88 to identify the processor type.

Referring now to FIG. 9, the processor information also may include a Processor Secondary Cache Size (PSCS) identifier 90. The PSCS identifier 90 informs the computer system of the size 92 of secondary cache installed with the processor. For an Intel Pentium Pro processor, the PSCS identifier 90 indicates the size of the secondary cache contained in the processor package. If more than two cache sizes are available for use with a processor family, the PSCS identifier 90 must have multiple bits.

Referring to FIGS. 10A and 10B, the processor information, including the FIDO, MIDO, PT, and PSCS signals, is provided by the processor 100 or by switches 101, or both, to a smart controller 94, such as a programmable logic device ("PLD"), on the processor circuit board 99. The PLD 94 uses the FIDO input to set the frequency of a programmable oscillator 96, which generates the system clock frequency that is provided by a clock driver 98 to the processor 100. The PLD 94 provides the MIDO signal to a bit divider 102, which converts the MIDO bits into the 4-bit signal (78 in FIG. 6) that tells the processor 100 how convert the system clock speed to the appropriate processor clock speed. The PT and PSCS inputs are provided to a shift chain 104 that can be accessed by operating the system software to establish the hardware present in the system. System ROM 103 provides supply voltage $V_{CCP}$ and termination voltage $V_{TT}$ information to the PLD 94, which the PLD 94 then uses to control the operation of variable voltage regulator 105, as described below.

Referring to FIG. 11, the computer system is able to determine and to provide the actual core voltage requirement $V_{CCP}$ of the processor 106, even for an Intel Pentium Pro processor having an incorrect VID value. When one processor in a lot fails to meet design specifications, all processors in that lot usually fail to meet the specifications. Thus, all processors in a lot generally are down-binned together. When a computer system manufacturer receives processors from the processor manufacturer, the computer manufacturer may obtain lot information identifying, among other things, the actual core voltage requirements of each lot of processors. The computer manufacturer may then store this information in a look-up table 108 in memory 110 (e.g., ROM). When a processor 106 is installed into the computer system, the system's PLD 112 may read the processor's internal CPU-ID register 114 to determine the processor's lot number and then use the lot number to retrieve the processor's actual $V_{CCP}$ requirement from the look-up table. The PLD then generates an output signal, which it stores to a general purpose register 116.

A variable voltage regulator 118 uses the information stored in the general purpose register 116 to generate the appropriate $V_{CCP}$ and $V_{TT}$ voltage levels for the processor 106. In the variable voltage regulator 118, a logic circuit 118A receives the information from the general purpose register 116 and calculates the corresponding $V_{CCP}$ and $V_{TT}$ voltage levels. The logic circuit 118A then issues a control signal to a DC/DC converter 118B that converts an input voltage level from a voltage source 119 into the appropriate $V_{CCP}$ and $V_{TT}$ values, as described below. For processors in Intel's Pentium Pro family, the variable voltage regulator 118 uses the information stored in the general purpose register 116 to correct the information provided by the processor's VID pins.

Referring to FIGS. 12 and 13, for the Intel Pentium Pro processor family, a processor's VID pins may call for a core voltage that differs from the actual core voltage requirement of the processor. The PLD 112 generates an Override Voltage Identification (ORVID) output 120 that identifies the difference (offset) 122 between the actual core voltage required by the processor and the voltage specified by the processor's VID pins. The ORVID output 120 preferably consists of four digital bits, thereby allowing sixteen different voltage offset values. The most significant bit ("MSB") 119a, ORVID[3], is a sign bit that indicates the direction of the voltage offset. The lower order bits, 119b–c, ORVID [2:0], determine the magnitude of the offset. In FIG. 13, two of the ORVID patterns ("1111" and "0111") are used to indicate that the voltage specified by the VID pins is correct (i.e., no voltage offset is required), and one of the ORVID patterns ("0000") is reserved. The thirteen remaining ORVID patterns represent voltage offset values ranging from −700 mV to +600 mV, in 100 mV increments. For processors with no VID pins, the ORVID pins may be used to indicate the actual core voltage requirement instead of a voltage offset value.

Referring to FIG. 14, the ORVID output is stored in the lower four bits 116a–d of a general purpose register 116, such as that at address C52h. The ORVID bits are provided from the register 116 to the variable voltage regulator, which uses the ORVID bits in conjunction with the output from the VID pins to produce the required processor core voltage. For an ORVID pattern of "0011", for example, the voltage regulator adds 400 mV to the voltage specified by the VID pins. Thus, for a P6.0 133 MHz processor, which has a VID value of 2.9 volts, an ORVID pattern of "0011" causes the voltage regulator to supply 3.3 volts.

FIG. 15 illustrates how the computer system's PLD generates the ORVID output for an Intel Pentium Pro processor. The PLD first determines (124) the core voltage level specified by the processor's VID pins. The PLD then retrieves (126) the processor's lot number from its internal CPU-ID register. Using the lot number, the PLD accesses (128) the ROM look-up table to determine the actual core voltage requirement of the processor. The PLD subtracts (130) the VID value from the look-up table value to determine the required voltage offset and then converts (132) the offset value into an ORVID pattern. The ORVID pattern is then placed (134) into the 8-bit register and provided (136) to the variable voltage regulator to generate the core voltage required by the processor.

When a processor is upgraded on-the-fly, the voltage must be stepped gradually from the current voltage to the required voltage. The steps must be limited to a predetermined size (e.g., 100 mV) with a minimum delay period (e.g., 5 milliseconds) between steps. Gradually changing the supply voltage in this manner insures that the voltage regulator overvoltage and undervoltage tracking circuitry will not be activated falsely. The 5 ms minimum delay only applies for activating the override function while the processor is running.

Referring now to FIG. 16, a processor manufacturer may employ either the GTL or the GTL⁺ standard within the same family of processors. In addition, the processor manufacturer may require the computer manufacturer to provide a termination voltage $V_{TT}$ that differs from the standard $V_{TT}$ value (1.2 volts for GTL; 1.5 volts for GTL⁺). Thus, to insure the availability of on-the-fly upgrades, the computer system generates an Override $V_{TT}$ Identification (ORV$_{TT}$ID) output 140 that allows the variable voltage regulator (118 in FIG. 11) to produce the required $V_{TT}$ value by applying a range of offset voltages 142 to the standard $V_{TT}$ value.

Referring also to FIG. 17, the ORV$_{TT}$ID output 140 preferably consists of three digital bits. The MSB 143a (ORV$_{TT}$ID[2]) determines the direction (i.e., sign) of the offset, and the ORV$_{TT}$ID[1:0] bits 143b–c determine the magnitude of the offset. In FIG. 16, two of the ORV$_{TT}$ID patterns ("111" and "011") are used to instruct the voltage regulator to supply the standard $V_{TT}$ value. The remaining six ORV$_{TT}$ID patterns are used to generate voltage offset values 142 ranging from −300 mV to +300 mV. If the voltage regulator generates a default termination voltage of 1.5 volts (i.e., the GTL⁺ standard), the ORV$_{TT}$ID output allows the termination voltage to vary from a value of 1.2 volts ($V_{TT}$ for the GTL standard) to 1.8 volts in 100 mV increments. For an on-the-fly upgrade, the steps must be limited to 100 mv with a minimum delay of 5 ms between steps. Gradually changing the $V_{TT}$ voltage insures that the overvoltage and undervoltage tracking circuitry will not be activated falsely.

Referring to FIG. 18, the ORV$_{TT}$ID output is stored in the fifth through seventh bits 116e–g of the 8-bit general purpose register 116 containing the ORVID output described above. The eighth bit 116h of the register 116 could be used to store an additional ORVID or ORV$_{TT}$ID bit, but otherwise is reserved. The ORV$_{TT}$ID bits are provided from the register 116 to the voltage regulator to generate the appropriate termination voltage.

Referring to FIG. 19, the ORV$_{TT}$ID output is determined in manner similar to that used to determine the ORVID output. The computer system's PLD first retrieves (144) the processor's lot number from the CPU-ID register. The lot number is used to access (146) a ROM look-up table (108 in FIG. 11) that indicates the actual $V_{TT}$ value required by the processor. The PLD then determines (148) the difference between the actual $V_{TT}$ value and the standard $V_{TT}$ value (1.5 volts) and converts (150) the result into an ORV$_{TT}$ID pattern. The ORV$_{TT}$ID pattern is stored (152) in the 8-bit register and used (154) by the voltage regulator to offset the default termination voltage.

Referring again to FIG. 4C, instead of providing information about the processor to the computer system, the pads 56e, 56f, 56g on the processor package 54 may be used to allow the processor manufacturer to select processor features, such as bus/core ratio (and therefore processor frequency), after the processor is packaged. For example, the manufacturer may design the processor 54 to receive a system clock of 50 MHz and to have a bus/core ratio selectable from a predetermined set of ratios (e.g., 1/3 and 1/4), which allows the manufacturer to select, post-packaging, the speed at which the processor operates. In this situation, pad 56f must connect to an internal bond pad 49 instead of to a conductive pin 52c. The bond pad 49 in turn must connect to the processor circuitry (not shown) that determines bus/core ratio. Using codes similar to the three-bit MIDO codes 82 of FIG. 7, if the manufacturer were to provide a three-bit input of "010" to three corresponding bond pads 49, the processor's bus/core ratio would be 1/3, and the processor clock would operate at 150 MHz. If the computer were to apply an input of "100", the bus/core ratio would be 1/4 and the processor would operate at 200 MHz.

Referring now to FIG. 20, signal lines in an open-drain GTL/GTL⁺ bus 155 may be terminated by a resistor network 156 having a single pull-up resistor 158. At one end, the pull-up resistor 158 connects to the termination voltage, and at the other end, the resistor 158 connects to a termination point 160 on the bus 155, e.g., at a system component ("chip A") 162. The processor 164 and other system components, e.g., "chip B" 166 and "chip C" 168, are connected to the termination point 160 in parallel through resistors 170, 172, 174. These resistors, which have resistance values much smaller than that of the pull-up resistor 158, block any line reflections that may occur in the legs 171, 173, 175 of the GTL/GTL⁺ bus. A system component, e.g., "chip D" 176, that is in close physical proximity (within 6 inches) to another system component, e.g., chip B 166, may be daisy-chained to the other component 166 without requiring an additional resistor. Any number of closely situated components may be daisy-chained in one leg 171, 173, 175 of the bus. Thus, in FIG. 18, the third leg 175 may be eliminated entirely if the components are positioned carefully.

The termination point 160 of the resistor network 156 may be located at any of the system components, so the resistor network 156 may be placed at virtually any location along the GTL bus 155. As a result, the circuit card designer has great flexibility in laying out the system components and the resistor network. Furthermore, because only a single pull-up resistor is required for each signal line, the resistance seen by the $V_{TT}$ power supply is twice as great as the equivalent resistance of a bus line having two termination resistors in parallel, thereby drawing half of the current drawn by a two resistor termination system.

Other embodiments are within the scope of the following claims. For example, processor information may be provided for any microprocessor family, including those manufactured by AMD, NexGen, Cyril, and Intel. Processor information also may be provided for any processor characteristic that affects the configuration of other system components. In addition, logic standards other than GTL/GTL⁺ may be used.

What is claimed is:

1. A computer comprising:
   a packaged integrated circuit having:
      circuitry for which an operational characteristic is not established until after the integrated circuit is packaged, and
      an information storage element that is configured after the integrated circuit is packaged to provide information based on the established operational characteristic, and
   a control circuit that uses the information to configure the computer.

2. The computer of claim 1 wherein the integrated circuit comprises at least one conductive pin protruding from the package to pass the information to the control circuit.

3. The computer of claim 1 wherein the information storage element is mounted onto a surface of the packaged integrated circuit after the integrated circuit is packaged.

4. The computer of claim 2 wherein the information storage element comprises an electrically conductive element connected at one end to the conductive pin and at another end to a voltage supply line.

5. The computer of claim 1 wherein the integrated circuit comprises a processor.

6. The computer of claim 1 wherein the information indicates a supply voltage value required by the integrated circuit.

7. The computer of claim 1 wherein the information indicates the difference between an actual value for a supply voltage required by the integrated circuit and a nominal design value for the supply voltage.

8. A computer comprising:
   a processor having:
   a package, and
   inside the package, circuitry for which a value of an operational parameter may be selected from a predetermined group of possible values after the processor is packaged, and
   a selection element that is mounted to an external surface of the package after the processor is packaged and configured to select the value of the operational parameter from the group.

9. The computer of claim 8 wherein the parameter comprises core operating frequency.

10. The computer of claim 8 further comprising a conductive lead extending from the surface into the processor package.

11. The computer of claim 10 wherein the selection device comprises an electrically conductive element connected at one end to the conductive lead and at another end to a voltage supply line.

12. A computer-implemented method of configuring a computer system to accommodate a packaged integrated circuit, the method comprising:
   retrieving from the packaged integrated circuit information based on an operational characteristic of the circuit that is not established until after the circuit is packaged, and
   using the information to configure the computer system automatically to accommodate the operational characteristic of the packaged integrated circuit.

13. The method of claim 12 wherein the integrated circuit comprises a processor.

14. A computer system comprising:
   a packaged integrated circuit having an information storage element containing information that specifies an amount of data that may be stored in a data storage area in the integrated circuit, and
   control circuitry that obtains the information from the packaged integrated circuit and configures the computer system in response to the information.

15. The computer system of claim 14 wherein the integrated circuit comprises at least one conductive pin that delivers the information to the control circuitry.

16. The computer system of claim 14 wherein the integrated circuit comprises a processor.

17. The computer system of claim 16 wherein the data storage area comprises a cache memory area in the processor.

18. A method of configuring a computer system to accommodate a packaged integrated circuit, comprising:
   retrieving from the packaged integrated circuit information specifying an amount of data that may be stored in a data storage area in the integrated circuit, and
   using the information to configure the computer system.

19. The method of claim 18 wherein the integrated circuit comprises a processor.

20. The method of claim 19 wherein the data storage area comprises a cache memory area in the processor.

21. A processor comprising:
   a package,
   inside the package, circuitry for which an operational characteristic is not established until after the processor is packaged,
   at least one conductive pin that protrudes from the package to deliver information based on the established operational characteristic to a circuit other than the processor, and
   a selection element mounted to a surface of the package after the processor is packaged to provide the information to the conductive pin.

22. The processor of claim 21 wherein the value selection element comprises an electrically conductive element connected electrically at one end to the conductive pin and at another end to a voltage supply line.

23. The processor of claim 21 wherein the value selection element comprises a resistor.

24. The processor of claim 21 further comprising two conductive pads electrically connected to each other by the value selection element on a surface of the package, one of the pads connecting to the conductive pin and the other pad connecting to a voltage source.

25. A packaged integrated circuit comprising:
   circuitry for which an operational characteristic is not established until after the integrated circuit is packaged,
   an information storage element that is configured, after the integrated circuit is packaged, with information based on the established operational characteristic, and
   an output element configured to provide the information from the information storage element to another circuit.

26. The packaged integrated circuit of claim 25 wherein the information storage element comprises multiple conductive pads on a surface of the package.

27. The packaged integrated circuit of claim 26 wherein each conductive pad is paired with another conductive pad, with one of the conductive pads in each pair connected to the output element and the other conductive pad connected to a voltage supply line.

28. The packaged integrated circuit of claim 26 wherein the information storage element also includes a conductive element mounted to the surface of the package between two conductive pads to assist in providing the information.

29. The packaged integrated circuit of claim 28 wherein the conductive element comprises a resistor.

30. The packaged integrated circuit of claim 26 wherein the output element is adapted for connection to a "pull-up" resistor that assists in providing the information.

31. The packaged integrated circuit of claim 26 wherein each conductive pad is grouped with two other conductive pads, with one of the conductive pads in each group connected to the control circuit and the other two conductive pads in the group connected to voltage supply lines having different voltage values.

32. The packaged integrated circuit of claim 31 further comprising a conductive element mounted to the surface of the package between two of the conductive pads in a group to assist in providing the information.

33. The packaged integrated circuit of claim 32 wherein the conductive element comprises a resistor.

34. A packaged integrated circuit comprising:
   circuitry for which an operational characteristic may be selected from a predetermined group of possible values after the integrated circuit is packaged, and
   a selection element that is mounted to a surface of the package after the integrated circuit is packaged and is configured to select the value of the operational characteristic from the group.

35. The packaged integrated circuit of claim 34 wherein the selection element includes two conductive pads, one of which is electrically connected to the circuitry and another of which is electrically connected to a voltage supply line.

36. The packaged integrated circuit of claim 35 wherein the selection element also includes a conductive element mounted to the surface of the package between the two conductive pads to assist in selecting the value of the operational characteristic.

37. The packaged integrated circuit of claim 36 wherein the conductive element comprises a resistor.

38. The packaged integrated circuit of claim 35 wherein a third conductive pad is electrically connected to another voltage supply line.

39. The packaged integrated circuit of claim 36 further comprising a conductive element mounted to the surface of the package between two of the three conductive pads to assist in selecting the value of the operational characteristic.

40. A packaged integrated circuit comprising:

circuitry for which an operational characteristic has an actual value that differs from a nominal design value, an information storage area configured after the integrated circuit is packaged to store information indicating the difference between the actual value and the nominal design value of the operational characteristic, and an output element configured to provide the information from the information storage area to another circuit.

41. The packaged integrated circuit of claim 40 wherein the information indicates both the magnitude and the direction of the difference between the actual value and the nominal design value.

42. The packaged integrated circuit of claim 40 wherein the operational characteristic comprises a power supply voltage required by the integrated circuit.

43. The packaged integrated circuit of claim 40 wherein the integrated circuit comprises a microprocessor.

44. The computer of claim 8 wherein the operational characteristic comprises bus/core ratio.

45. The computer system of claim 16 wherein the processor is manufactured to operate at a designed core operating frequency, and further comprising an information storage element that specifies the actual core operating frequency of the processor.

46. The computer system of claim 16 further comprising an information storage element that specifies processor type.

47. The computer system of claim 16 wherein the information storage element specifies secondary cache memory size.

48. The method of claim 19 wherein the processor is manufactured to operate at a designed core operating frequency, and further comprising retrieving from the processor information indicating the actual core operating frequency of the processor.

49. The method of claim 19 further comprising retrieving from the processor information indicating processor type.

50. The method of claim 19 wherein the information indicates secondary cache memory size.

51. A method for use in configuring an electronic device to accommodate a packaged integrated circuit, the method comprising:

retrieving from the integrated circuit information indicating the difference between an actual value of an operational characteristic of the integrated circuit and a nominal design value for the operational characteristic, and automatically configuring the electronic device to function with the integrated circuit.

52. The method of claim 51 wherein the information indicates both the magnitude and the direction of the difference between the actual value and the nominal design value.

53. The method of claim 51 wherein the operational characteristic comprises a power supply voltage required by the integrated circuit.

54. The method of claim 51 wherein the integrated circuit comprises a microprocessor.

* * * * *

UNITED STATES PATENT AND TRADEMARK OFFICE
CERTIFICATE OF CORRECTION

PATENT NO.       : 6,035,407
DATED            : March 7, 2000
INVENTOR(S)      : Ghassan R. Gebara and Kenneth A. Jansen It is certified that error appears in the above-identified patent and that said Letters Patent is hereby corrected as shown below:

Title page,
Item [54],
In the Title, change "Accomodating" to -- Accommodating --;

Column 13,
Line 11, change "36" to -- 38 --.

Signed and Sealed this

Thirtieth Day of October, 2001

Attest:

NICHOLAS P. GODICI
*Attesting Officer*   *Acting Director of the United States Patent and Trademark Office*